United States Patent [19]

Teal

[11] 4,024,421
[45] May 17, 1977

[54] MAGNETICALLY OPERABLE ENGINE OR POWER PLANT

[76] Inventor: Benjiman R. Teal, 611 Marion St. NW., Madison, Fla. 32340

[22] Filed: Mar. 24, 1976

[21] Appl. No.: 669,900

[52] U.S. Cl. .................................. 310/24; 310/34; 310/35
[51] Int. Cl.² ........................................ H02K 7/06
[58] Field of Search ................. 310/23, 24, 34, 35, 310/32

[56] References Cited

UNITED STATES PATENTS

| | | | |
|---|---|---|---|
| 568,947 | 10/1896 | Hicks | 310/24 |
| 1,131,614 | 3/1915 | Radtke | 310/24 |
| 1,347,002 | 7/1920 | Baule | 310/24 |
| 1,886,040 | 11/1932 | Moodyman | 310/24 |
| 2,056,719 | 10/1936 | Gelnaw | 310/35 X |
| 2,639,544 | 5/1953 | Coffin | 310/35 X |
| 3,688,136 | 8/1972 | Salverdo | 310/24 |
| 3,832,608 | 8/1974 | Mills | 310/35 X |

*Primary Examiner*—Donovan F. Duggan
*Attorney, Agent, or Firm*—J. Wesley Everett

[57] ABSTRACT

A magnetically operable engine or power plant embodying a rotary crankshaft having two or more offset cranks which, by means of respective connecting rods pivoted thereto, and also to the sliding cores or armatures of electromagnets, are actuated to apply torque to the crankshaft for driving purposes. Electrical current is supplied to the magnet windings by fixed distributor switches which are successively operated by one or more cams effectively mounted on the crankshaft, the switches receiving pulses of current in timed relationship and in such a manner that torque is continuously applied to the crankshaft.

2 Claims, 6 Drawing Figures

MAGNETICALLY OPERABLE ENGINE OR POWER PLANT

The present invention relates to a magnetically operable engine or power plant which, in a general way, functions in the manner of an internal combustion engine in that it employs a rotary crankshaft having offset cranks which derive their motion from power driven reciprocating members. Unlike a conventional combustion engine, the reciprocating members, instead of being motivated by the explosion of combustible gases in a combustion chamber, are caused to reciprocate by magnetic attraction, such members being in the form of cores or armatures which are associated with electromagnets, there being at least one magnet for each crank. Motivating current impulses are successively supplied to the various magnets by distributor means embodying respective normally open circuit making and breaking devices which are successively closed by one or more cams that rotate with the camshaft. The basic principle involved in thus applying torque to the crankshaft may appropriately be referred to as "magnipulsion" (a coined word) and such term may be employed where appropriate throughout this specification.

The present magnetically operable engine or power plant is capable of being used as a power source in connection with a wheeled automotive vehicle of either the passenger-carrying type or as a toy automobile. It is also capable of being used as a fixedly mounted power plant for driving adjacent machinery of various sorts but, irrespective of the particular use to which the invention may be put, the essential features thereof are at all times preserved.

The provision of an engine which is extremely simple in its construction and which therefore may be manufactured at a low cost; one which is comprised of a minimum number of parts, particularly moving parts, and which therefore is unlikely to get out of order; one which is rugged and durable and which therefore will withstand rough usage; one which is smooth and silent in its operation; one which is capable of ease of assembly and disassembly for purposes of inspection of parts, replacement or repair thereof; and one which otherwise is well adapted to perform the services required of it are further desirable features which have been borne in mind in the production and development of the present invention.

The provision of an engine or power plant such as has briefly been outlined above, and possessing the stated advantages, constitutes the principal object of the invention. Numerous other objects and advantages of the invention, not at this time enumerated, will become readily apparent as the nature of the invention is better understood.

In the accompanying two sheets of drawings forming a part of this specification, one illustrative embodiment of the invention has been shown.

Figure 1:
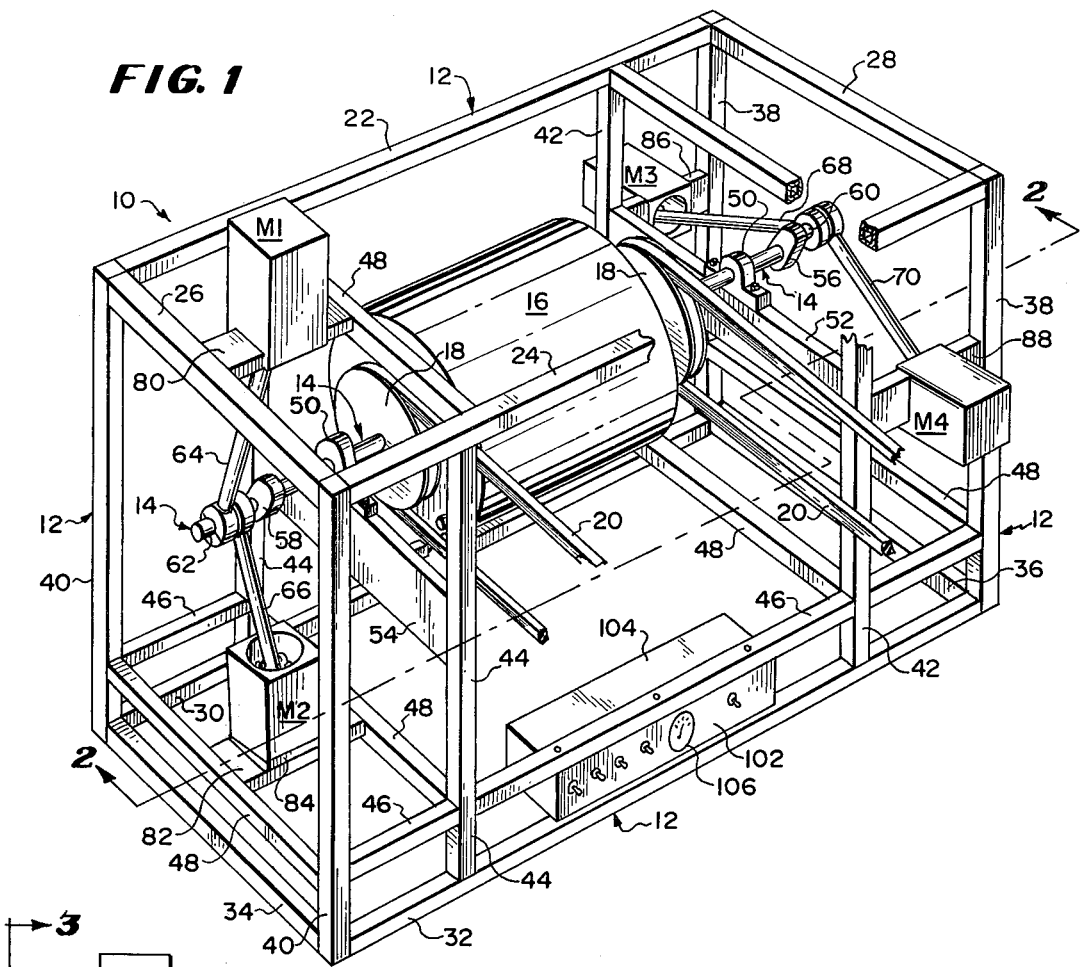
FIG. 1 is a perspective view of a magnetically operable power plant or engine embodying the principles of the present invention, portions of the framework or chassis being broken away in the interests of clarity.
Figure 2:
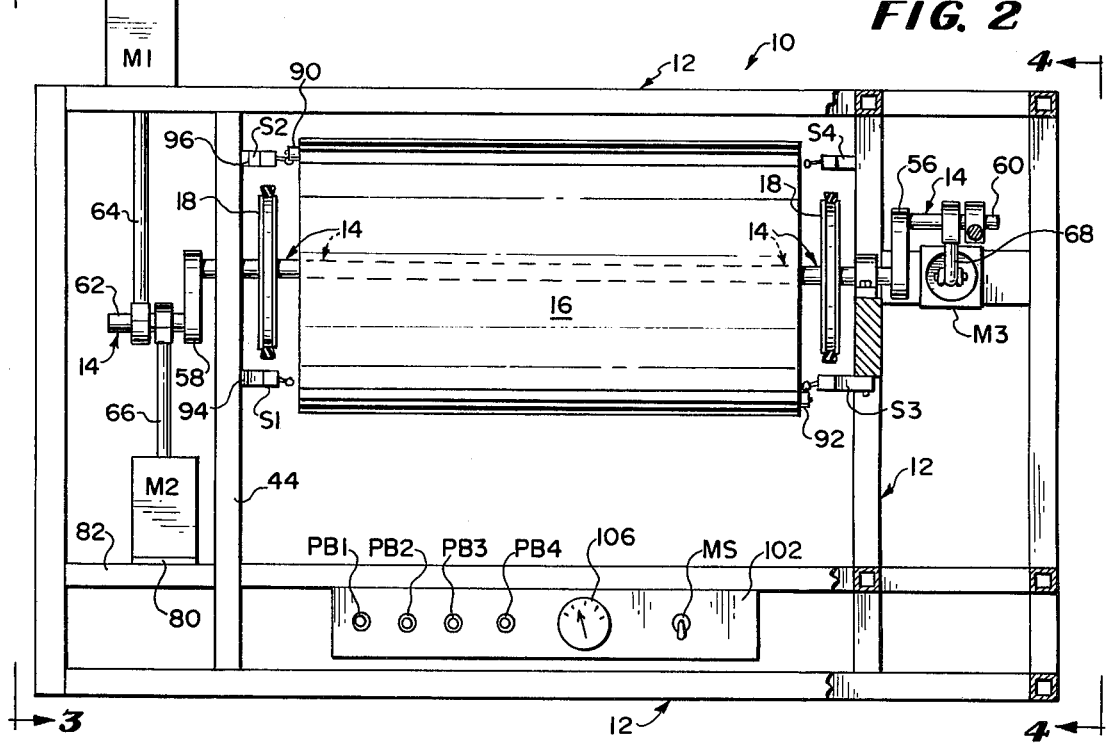
FIG. 2 is a sectional view taken substantially on the vertical plane indicated by the line 2—2 of FIG. 1 and in the direction of the arrows.

Referring now to the drawings in detail, and in particular to FIGS. 1 and 2, a power plant or engine constructed according to the invention is designated in its entirety by the reference numeral 10 and it embodies in its general organization a chassis or framework 12 which serves to rotatably support an elongated crankshaft 14 on which there is mounted a relatively massive flywheel 16 in the medial region thereof. A pair of pulleys 18 on opposite sides of the flywheel 16 have associated therewith respective drive belts 20 which may extend to a suitable transmission (not shown) in the case of a wheeled automative vehicle, or to the input drive element in the case of a stationary equipment which is to be driven by the power plant.

The framework 12 is comprised of an upper rectangular frame having longitudinal frame members 22 and 24 and transverse frame members 26 and 28, and a lower rectangular frame having longitudinal frame members 30 and 32 and transverse frame members 34 and 36. The framework 12 further includes a pair of intermediate posts 40 and front and rear vertical intermediate posts 42 and 44 respectively. A series of longitudinal struts 46 and transverse struts 48 extend variously between the posts 38, 40, 42, and 44 and establish an intermediate rectangular frame a slight distance above the lower rectangular frame 30, 32, 34 and 36.

A pair of bearing assemblies 50 are supported upon transverse support bars 52 and 54 and serve to rotatably support the crankshaft 14. Such crankshaft is provided with crank arms 56 and 58 on opposite sides of the flywheel 16 and with offset cranks 60 and 62. The crank 62 is connected by means of connecting rods 64 and 66 to respective electromagnets M1 and M2 which are fixedly mounted on the framework 12, while the crank arm 60 is similarly connected by connecting rods 68 and 70 to respective electromagnets M3 and M4, all in a manner that will be made clear presently.

Figure 3:
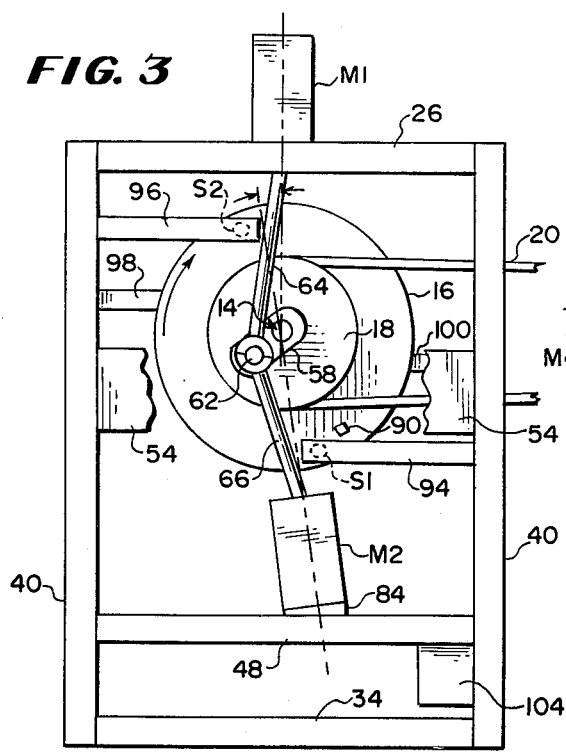
FIG. 3 is an end elevational view taken in the direction of the arrows associated with the line 3—3 of FIG. 2.
Figure 5:
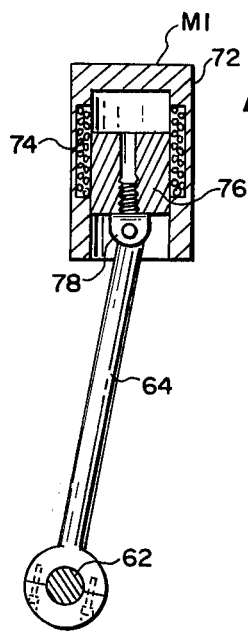
FIG. 5 is an enlarged detail sectional view taken through one of the electromagnets and its associated connecting rod and crank which are employed in connection with the invention.

The various electromagnets M1, M2, M3 and M4, together with their associated connecting rods 64, 66, 68 and 70 are substantially identical and therefore a description of one of them will suffice for them all. Accordingly, the magnet M1 (see also FIG. 5) embodies a magnet casing or shell 72 within which there is disposed a magnet winding 74. An armature or core 76 is slidably disposed within the casing 72 and is pivotally connected as indicated at 78 to the associated connecting rod 64. The remaining magnets M2, M3 and M4 are similarly connected to their associated connecting rods The magnet M1 is mounted in a vertical position upon an upper shelf member 80 while the magnet M2 is mounted in a slightly inclined position upon a lower shelf member 82. As best shown in FIGS. 1, 2 and 3, the magnet M2 is seated upon a wedge-shaped base plate or block 84 which serves to misalign the axis of the magnet M2 from the axis of the magnet M1 by a small angle for a purpose that will be made clear presently. The magnet M3 is mounted in a horizontal position by means of a support member 86 while the magnet M4 is similarly mounted in a substantially horizontal position by means of a support member 88, the axis of the magnet M4 being slightly misaligned with respect to the axis of the magnet M3 likewise for a purpose that will be set forth subsequently.

Figure 4:
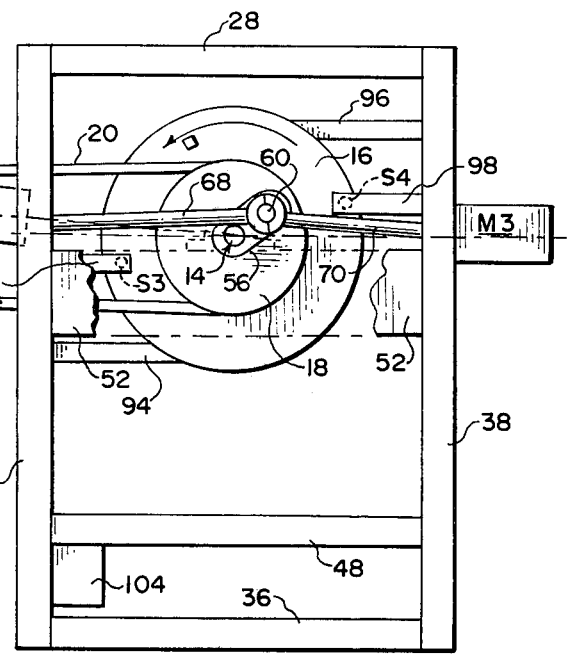
FIG. 4 is an end elevational view taken in the direction of the arrows associated with the line 4—4 of FIG. 2.

Referring now to FIGS. 2, 3 and 4, one end of the flywheel 16 carries a cam 90 which is designed for successive engagements with a pair of substantially diametrically opposed microswitches S1 and S2 which are carried at the ends of a pair of horizontal supporting bars 94 and 96 respectively. Similarly, the other end of the flywheel 16 carries a cam 92 which is designed for successive engagement with a pair of substantially horizontally opposed microswitches S3 and S4 which are carried at the ends of a pair of horizontal supporting bars 98 and 100 respectively. As will become more readily apparent when the operation of the herein described magnetically operable engine or power plant is set forth in connection with the circuit diagram of FIG. 6, the arrangement of the various cams and microswitches is such that upon rotation of the crankshaft 14 and flywheel 16, the contacts associated with the microswitches S1, S3, S2 and S4 will become individually closed, successively and in the order named.

Figure 6:
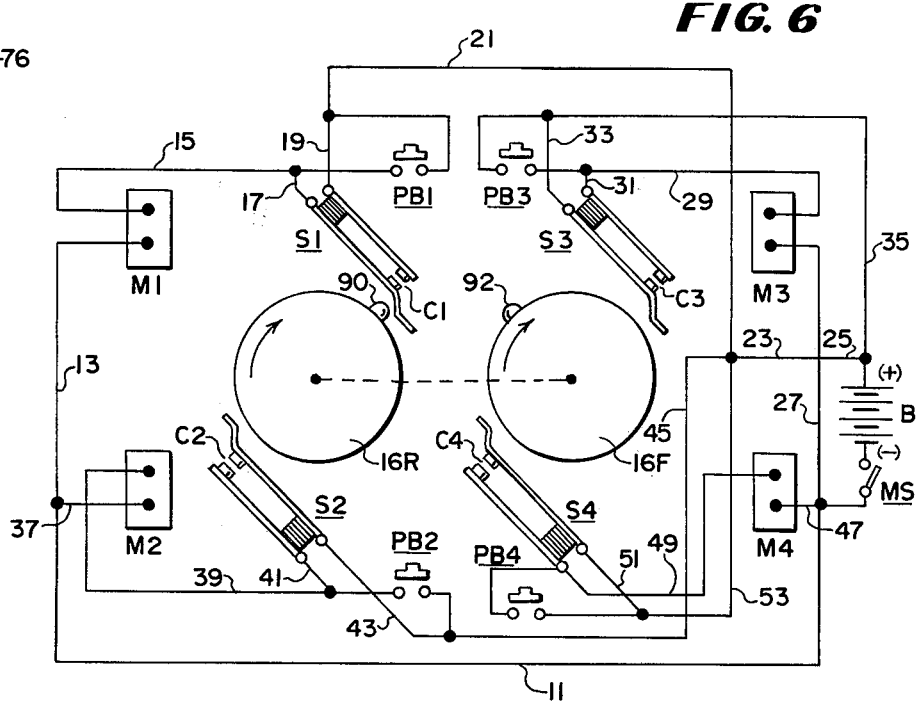
FIG. 6 is an electric circuit diagram of the power plant or engine.

Considering now the operation of the herein described magnetically operable engine or power plant 10, and with reference to FIG. 6, it will be assumed that initially the position of the crankshaft 14 is such that, as shown in FIG. 3, energization of the magnet M1 will swing the crank 62 upwardly at such time as the cam 90 engages the microswitch S1. Closure of the C1 contacts associated with the switch S1 will establish a circuit leading from the negative side of the battery B, through the master switch MS, through leads 11, 13, magnet M1, leads 15, 17, contacts C1 of the switch S1, and leads 19, 21, 23 and 25, back to the positive side of the battery B. Energization of the magnet M1 will draw the core or armature 76 (FIG. 5) into the shell 72 and thus place the connecting rod 64 under tension so as to pull the crank 62 upwardly, thereby placing the crankshaft under torque for motivating purposes.

At approximately 90° in the engine cycle, the cam 90 will engage the switch S3 and closure of the contacts C3 thereof will establish a circuit from the master switch MS through lead 27, magnet M3, leads 29, 31, C3 contacts of the switch S3, and leads 33, 35 back to the battery B, thus applying torque to the crankshaft 14 by placing the connecting rod 68 under tension.

At approximately 180° in the engine cycle, the cam 90 will engage the switch S2 and closure of the C2 contacts thereof will establish a circuit from the master switch MS through leads 11, 37, magnet M2, leads 39, 41, contacts C2 of the switch S2, and leads 43, 23, 25 back to the battery B, thus applying torque to the crankshaft 14 by placing the connecting rod 66 under tension.

At approximately 270° in the engine cycle, the cam 92 will engage the switch S4 and closure of the contacts C4 thereof will establish a circuit from the master switch MS, through lead 47, magnet M4, lead 49, C4 contacts of the switch S4, and leads 51, 43, 23, 25 back to the battery B, thus placing the connecting rod 70 under tension and applying torque to the crankshaft 14. The cycle is repetitious.

As shown in FIGS. 1 and 2, a control panel 102 is associated with a container or box 104 for the battery B and such panel may be provided with the aforementioned master switch MS and an indicator 106 which may disclose the amperage of current flowing from the battery B. Four push button switches PB1, PB2, PB3 and PB4 may also be provided on the control panel 102 and, as shown in FIG. 6, such push button switches are arranged so that they operate upon closure thereof to establish shunts across the respective microswitches S1, S2, S3 and S4 so that an initial momentary closure of a selected push button switch on a trial and error basis may cause torque to be applied to one or the other cranks 60 or 62 for initial application of torque to the crankshaft 14 in the event that neither crank is in a favorable position for engine starting at the time that the master switch MS is initially closed.

It is to be noted at this point that although the cams 90 and 92 are disclosed in FIG. 2 as being disposed at approximately 180° from each other on the flywheel 16, such cams appear in FIG. 6 as being 90° apart. It should be understood however that the disclosure of FIG. 6 is purely schematic and is intended to illustrate only the sequence of operation of the four switches S1, S2, S3 and S4 under the control of the cams 90 and 92 and that the front and rear end faces 16F and 16R shown in FIG. 6 rotate in the same direction since they do not represent front and rear end faces in the sense that they are illustrated in FIGS. 3 and 4. In other words, FIG. 6 is predicated solely upon the sequence of microswitch operation and does not represent a true positioning of parts such as is disclosed in FIGS. 1 to 4 inclusive. It is also to be noted that by reason of the slight axial misalignment of the magnets M1 and M2, and of the magnets M3 and M4, continuous crankshaft movement is effected since at no time will the engine or power plant 10 attain a position of dead-center where closure of the master switch crankshaft 14.

The invention is not to be limited to the exact arrangement of parts shown in the accompanying drawings or described in this specification as various changes in the details of construction may be resorted to without departing from the spirit of the invention. For example, the precise placement of the various cams 90 and 92 and microswitches S1, S2, S3 and S4 on the flywheel 16 and framework 12 may be varied if desired as regards their angular relationship with respect to one another, the only criteria being the attainment of sequential operation of the switches in such a manner that torque is applied to the crankshaft 14 at all times by at least one of the four connecting rods. Furthermore, if desired a greater or lesser number of electromagnets suitably mounted on the framework 12, together with a commensurate modification of the nature of the crankshaft 14, may be resorted to if deemed appropriate. Therefore, only insofar as the invention has particularly been pointed out in the accompanying claims is the same to be limited.

I claim:

1. A magnetically operated power plant comprising a work frame, an axially extended crank shaft rotatably mounted on said frame, a pair of spaced bearings one on each side of the frame for supporting a crank shaft, a fly wheel mounted on the crank shaft between the said spaced bearings, a crank arm fixed to each end of the crank shaft adjacent the said bearings and substantially 180° apart and on the opposite side of the bearings from the fly wheel, a pair of spaced hollow electro-magnets positioned substantially diametrically opposite each other at each side of the frame and in substantially the same plane with the crank arm and perpendicular to the axis of the crank shaft, an armature for each electro-magnet adapted to slide within each of the hollow electro-magnets, a connecting rod for each armature having one end pivotally connected to the armature and the opposite end connected to one of the crank arms, an electric current for timely energizing the electro-magnets when the armature is substantially adjacent one end of the electro-magnet, a timing means comprising a micro-switch for each electro-magnet fixedly mounted on said frame work, each switch including a pair of normally open contacts and disposed in series relation with said electro-magnet, said switch being disposed in circumferential spaced relationship about the crank shaft, means carried at each end of the fly-wheel for closing each of the said switches progressively on alternate sides of the frame to the respective electro-magnets in the direction of the operated crank shaft substantially at the time the solenoid is at one end of the electro-magnet, the electro-magnets of each pair having their axes slightly inclined at an angle to each other whereby the associated crank arms are minimized.

2. A magnetically operated power plant as set forth in claim 1 wherein there is provided a push button switch for each electro-magnet and is effective upon depression thereof to shunt the contacts of its associated switch for moving the said crank shaft off center.

* * * * *